(No Model.)

A. STOCKDALE.
NUT LOCK.

No. 483,241. Patented Sept. 27, 1892.

WITNESSES:
T. A. Murphy.
L. G. Susemihl.

INVENTOR:
Alexander Stockdale
per Wm. K. White
Attorney

UNITED STATES PATENT OFFICE.

ALEXANDER STOCKDALE, OF WOLCOTT, IOWA.

NUT-LOCK.

SPECIFICATION forming part of Letters Patent No. 483,241, dated September 27, 1892.

Application filed July 26, 1892. Serial No. 441,288. (No model.)

*To all whom it may concern:*

Be it known that I, ALEXANDER STOCKDALE, a citizen of the United States, residing at Wolcott, in the county of Scott and State of Iowa, have invented a new and useful Improvement in Nut-Locks, of which the following is a specification.

My invention relates to the locking and securing a nut upon a bolt at any desired position; and the object of my invention is to produce a device for so locking the nut which is effective and also simple and cheap. I accomplish these objects by the mechanism illustrated in the accompanying drawings, in which—

Figure 1:
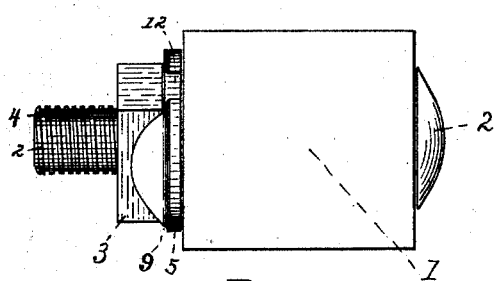
Figure 2:
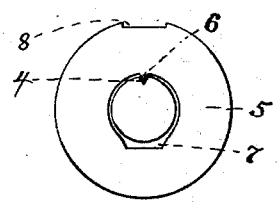
Figure 3:
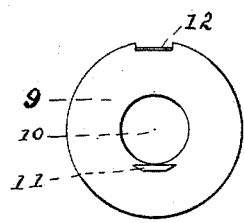
Figure 4:
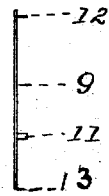

Figure 1 is a side view of a bolt, showing my invention. Fig. 2 is an end view of the bolt, showing the circular washer thereon. Fig. 3 is a front view of the locking-plate, and Fig. 4 is a side view of the same.

Similar numerals of reference refer to similar parts throughout the several views.

1 represents a block of wood, 2 a bolt passed through an aperture therein, and 3 a nut, such bolt and nut being properly threaded. The bolt is provided with a longitudinal groove 4, passing through its thread, and such groove may extend the entire length of its threaded portion, or less, as may be desired.

The circular washer 5 is provided with a circular aperture slightly greater in diameter than the diameter of the bolt, upon the wall or circumference of which is a tongue 6, constructed and adapted to engage in the groove 4 when said washer is placed over or upon the bolt, while the opposite side of such wall or circumference is provided with a depression or cut-out portion 7, and the periphery of said washer is also provided with a channeled or cut-out portion 8.

The circular locking-plate 9 is provided with a circular aperture 10 of such diameter as to easily fit said bolt, and adjacent to said aperture upon the face of such plate is a projecting lug 11, constructed and adapted to enter the cut-out portion 7 of the washer and be interposed between the same and said bolt, and the periphery of said locking-plate is provided with a horizontal extension 12, constructed and adapted to enter or fit into the channeled or cut-out portion 8 in the periphery of the washer. After the bolt has been placed in the desired position the washer is first passed over the bolt and its tongue caused to enter the groove in the bolt, as illustrated in Fig. 2. The locking-plate is then passed over the bolt, its lug entering the cut-out portion 7 in the washer between it and the bolt and its horizontal extension entering the channeled portion 8 in the periphery of the washer. The nut is then placed upon the bolt and screwed up, as desired, and then one of the edges of said plate, as at 13, is bent outward and forced against the plane or one of the square sides of said nut, and by this means the nut is locked or secured upon the bolt.

The locking-plate should be constructed of metal and of such thickness as to permit a side to be bent outward, as explained, and yet be of sufficient thickness that when so bent it will retain its position and prevent the nut from turning upon the bolt.

I do not broadly claim a nut-locking device, but confine myself to my particular device, not, however, desiring to limit myself to the precise form as illustrated, as such may be modified and changed without departing from the scope of my invention.

What I claim as new, and desire to secure by Letters Patent, is—

In a nut-lock, the combination, with a bolt and nut, of the longitudinal groove in the thread of said bolt, the circular washer provided with a tongue to engage said groove, the depression in the circumference of the aperture in said washer, the channeled portion in the periphery of said washer, the circular locking-plate provided with the circular aperture, the projecting lug upon said plate adjacent to said aperture, the horizontal extension in the periphery of said plate, and a portion of said plate bent outward against the plane of said nut, substantially as described.

ALEXANDER STOCKDALE.

Witnesses:
T. A. MURPHY,
L. G. SUSEMIHL.